US00RE50138E

(19) United States
(12) Reissued Patent
Jacoby et al.

(10) Patent Number: US RE50,138 E
(45) Date of Reissued Patent: Sep. 24, 2024

(54) CONTROL DEVICE

(71) Applicant: Lutron Technology Company LLC, Coopersburg, PA (US)

(72) Inventors: Elliot G. Jacoby, Glenside, PA (US); Jason C. Killo, Emmaus, PA (US); Brad Michael Kreschollek, Bethlehem, PA (US)

(73) Assignee: Lutron Technology Company LLC, Coopersburg, PA (US)

(21) Appl. No.: 29/895,112

(22) Filed: Jun. 16, 2023

Related U.S. Patent Documents

Reissue of:
(64) Patent No.: Des. 807,763
Issued: Jan. 16, 2018
Appl. No.: 29/578,733
Filed: Sep. 23, 2016

U.S. Applications:
(63) Continuation of application No. 29/827,327, filed on Feb. 18, 2022, now Pat. No. Re. 49,554, which is a continuation of application No. 29/695,315, filed on Jun. 18, 2019, now Pat. No. Re. 48,936, which is an application for the reissue of Pat. No. Des. 807,763, which is a continuation of application No.
(Continued)

(51) LOC (14) Cl. ..... 10-04
(52) U.S. Cl.
USPC ..... D10/50; D13/162.1; D13/164
CPC ..... *F24F 11/52* (2018.01)
(58) Field of Classification Search
USPC ..... D13/162.1, 164; D10/49, 50
CPC . F23N 5/20; F23N 5/203; F23N 5/206; F23N 2025/12; F23N 2041/02; F24F 11/00; F24F 11/001; F24F 11/0009; F24F 11/0012; F24F 2011/0057; F24F 2011/0073; F24F 2011/0091; G05D 23/1917; H05B 37/02; H05B 37/0245; H01H 9/02; H01H 9/16; H01H 9/161; H01H 9/165; H01H 9/181; H01H 9/182; H01H 2009/187
See application file for complete search history.

(56) References Cited

U.S. PATENT DOCUMENTS 4,316,256 A 2/1982 Hendricks et al.
4,780,573 A 10/1988 Own
(Continued)

OTHER PUBLICATIONS

BTicino Spa, Matix Brochure, May 2009, 16 pages.
(Continued)

*Primary Examiner* — Philip S Hyder
(74) *Attorney, Agent, or Firm* — Saidman DesignLaw Group, LLC

(57) CLAIM

We claim the ornamental design for a control device, as shown and described.

DESCRIPTION

FIG. 1 is a perspective view of a control device showing our new design.
FIG. 2 is a front view thereof.
FIG. 3 a left side view thereof.
FIG. 4 is a right side view thereof.
FIG. 5 is a top view thereof; and,
FIG. 6 is a bottom view thereof.
The rear [views] *view* forms no part of the design and is omitted. The portions of the drawings appearing in broken lines are for environment only and do not form part of the claimed design.

1 Claim, 4 Drawing Sheets

Matter enclosed in heavy brackets [ ] appears in the original patent but forms no part of this reissue; matter printed in italics indicates the additions made by reissue.

Amended

Related U.S. Application Data

29/515,922, filed on Jan. 28, 2015, now Pat. No. Des. 769,829.

(56) References Cited

U.S. PATENT DOCUMENTS

| | | | | |
|---|---|---|---|---|
| D309,268 | S | | 7/1990 | Wada et al. |
| D310,340 | S | | 9/1990 | Wada et al. |
| D316,681 | S | * | 5/1991 | Takasuna ..... D10/49 |
| D320,410 | S | | 10/1991 | Gotham |
| D364,350 | S | | 11/1995 | Pasquarette et al. |
| D364,573 | S | | 11/1995 | Pearsall |
| 6,260,765 | B1 | | 7/2001 | Natale et al. |
| D453,742 | S | | 2/2002 | Butler et al. |
| D466,090 | S | | 11/2002 | Bennett et al. |
| D547,273 | S | | 7/2007 | Mierta et al. |
| D549,710 | S | | 8/2007 | Hynecek et al. |
| D588,035 | S | | 3/2009 | Schmalz et al. |
| 7,566,996 | B2 | | 7/2009 | Altonen et al. |
| D623,606 | S | * | 9/2010 | Nakai ..... D13/168 |
| D633,448 | S | | 3/2011 | Biery et al. |
| D642,992 | S | * | 8/2011 | Sasaki ..... D13/164 |
| D646,185 | S | * | 10/2011 | Edgar ..... D10/50 |
| D649,123 | S | | 11/2011 | Jacoby et al. |
| D649,124 | S | | 11/2011 | Jacoby et al. |
| D649,520 | S | | 11/2011 | Jacoby et al. |
| D666,927 | S | * | 9/2012 | Krumpe ..... D10/50 |
| D678,223 | S | | 3/2013 | Wisniewski et al. |
| D686,167 | S | | 7/2013 | Wisniewski et al. |
| 8,525,372 | B2 | | 9/2013 | Huang |
| D690,661 | S | * | 10/2013 | Wisniewski ..... D13/162 |
| D694,195 | S | * | 11/2013 | Gammon ..... D13/162 |
| D706,729 | S | | 6/2014 | Joshi et al. |
| D706,731 | S | | 6/2014 | Altonen et al. |
| D706,732 | S | | 6/2014 | Altonen et al. |
| D707,186 | S | | 6/2014 | Sloan |
| D707,191 | S | | 6/2014 | Altonen et al. |
| D714,234 | S | | 9/2014 | Altonen et al. |
| D717,742 | S | | 11/2014 | Larkin et al. |
| D720,306 | S | | 12/2014 | Altonen et al. |
| 8,978,994 | B2 | | 3/2015 | Moore et al. |
| D734,277 | S | | 7/2015 | Jacoby et al. |
| D737,154 | S | | 8/2015 | Jacoby et al. |
| 9,119,240 | B2 | | 8/2015 | Nagazoe |
| D738,229 | S | * | 9/2015 | Jiang ..... D10/50 |
| D738,753 | S | * | 9/2015 | Edgar ..... D10/50 |
| 9,124,130 | B2 | | 9/2015 | Altonen et al. |
| 9,157,647 | B2 | | 10/2015 | Leen et al. |
| 9,167,666 | B1 | | 10/2015 | Billheimer et al. |
| D742,335 | S | * | 11/2015 | Yamaguchi ..... D10/49 |
| D750,981 | S | * | 3/2016 | Jacoby ..... D10/50 |
| D768,582 | S | | 10/2016 | Jacoby et al. |
| D770,393 | S | | 11/2016 | Jacoby et al. |
| D775,975 | S | * | 1/2017 | Jacoby ..... D10/50 |
| D775,976 | S | * | 1/2017 | Jacoby ..... D10/50 |
| D780,699 | S | | 3/2017 | Zhang |
| D784,168 | S | * | 4/2017 | Jacoby ..... D10/50 |
| D797,684 | S | | 9/2017 | Poulheim et al. |
| D809,943 | S | | 2/2018 | Jacoby et al. |
| D834,535 | S | | 11/2018 | Poulheim et al. |
| D835,051 | S | | 12/2018 | Poulheim et al. |
| 2011/0253516 | A1 | | 10/2011 | Figueroa et al. |
| 2012/0091213 | A1 | | 4/2012 | Altonen et al. |
| 2013/0285472 | A1 | | 10/2013 | Bull |
| 2014/0184418 | A1 | | 7/2014 | Maeda et al. |
| 2014/0268630 | A1 | | 9/2014 | Samuels |
| 2015/0076991 | A1 | | 3/2015 | Yamamoto et al. |
| 2015/0316285 | A1 | | 11/2015 | Clifton et al. |

OTHER PUBLICATIONS

Dynalite Intelligent Light Pty Ltd., Light News, Aug. 2005, 8 pages, issue 2.

Design U.S. Appl. No. 29/502,412, filed Sep. 16, 2014. (Unpublished).

Design U.S. Appl. No. 29/515,919, filed Jan. 28, 2015. (Unpublished).

Design U.S. Appl. No. 29/515,921, filed Jan. 28, 2015. (Unpublished).

Design U.S. Appl. No. 29/515,924, filed Jan. 28, 2015. (Unpublished).

* cited by examiner

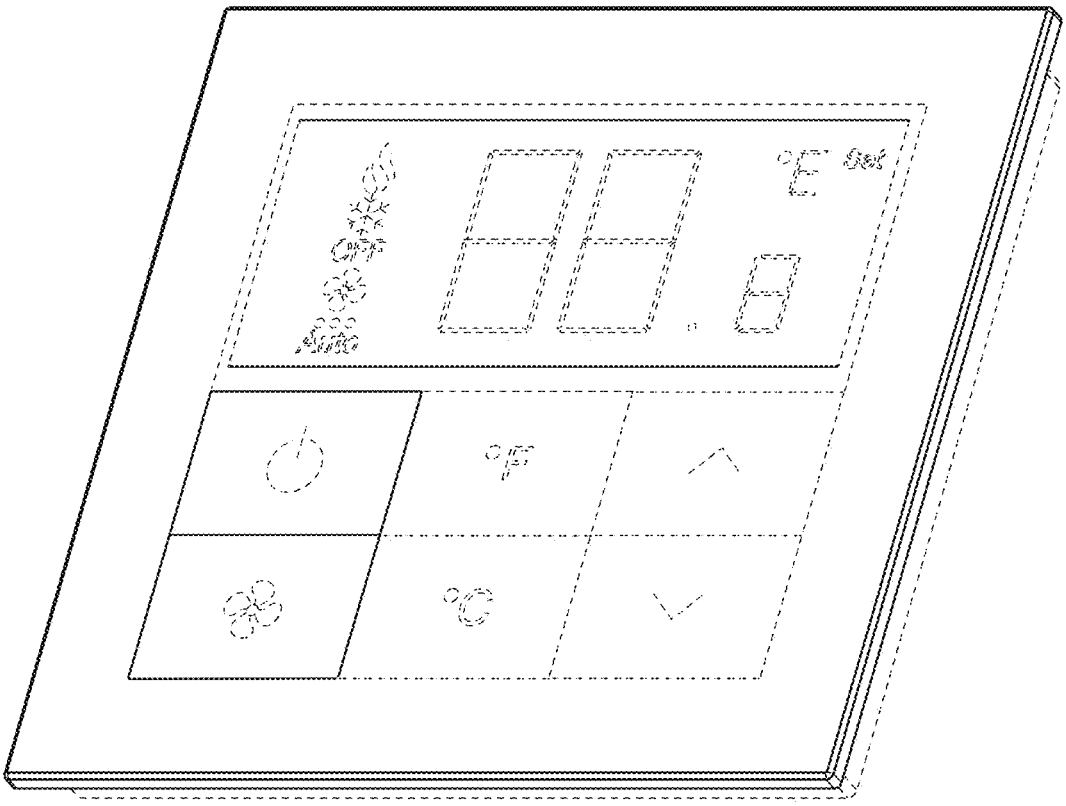
FIG. 1 Amended

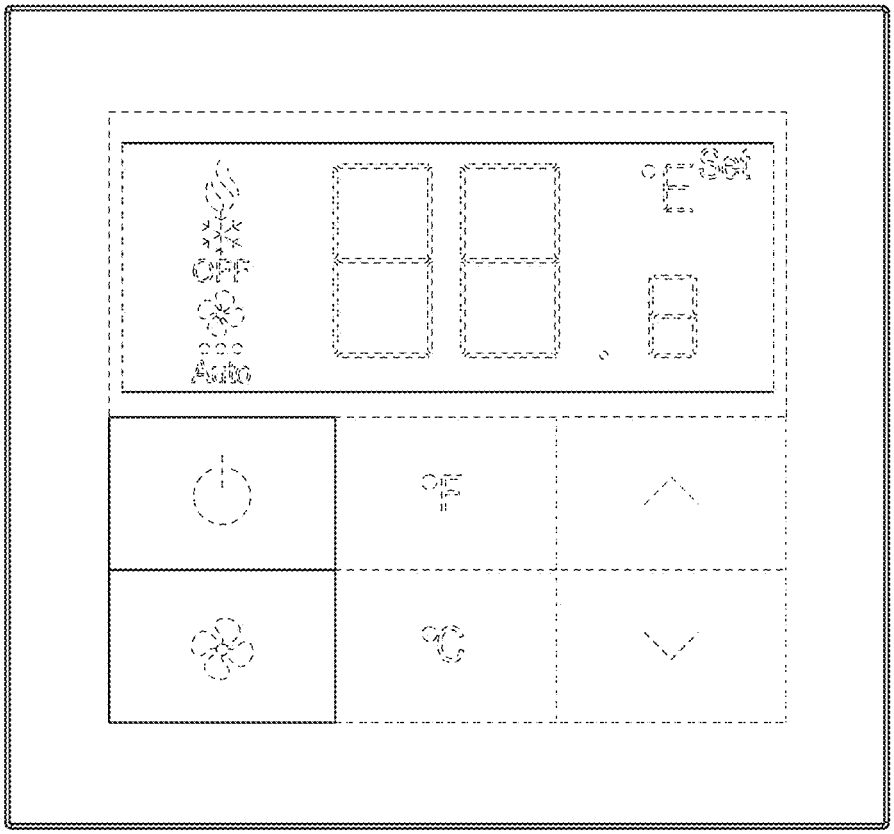
FIG. 2 Amended

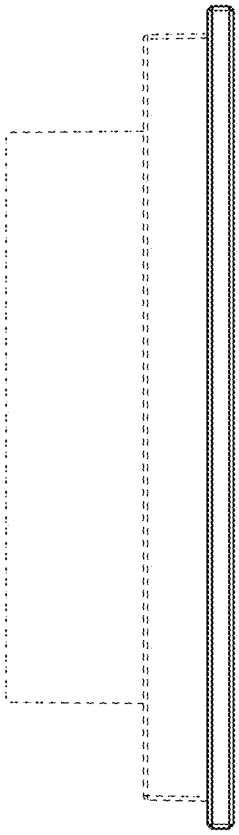
FIG. 3 Amended
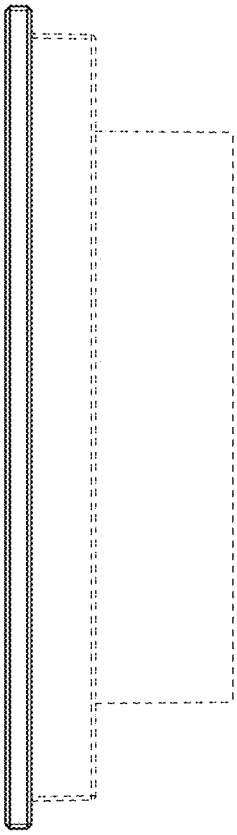
FIG. 4 Amended

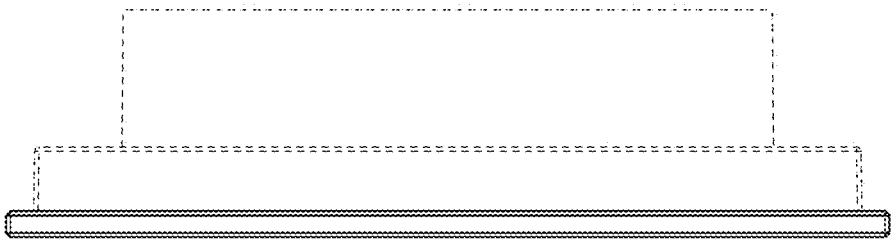
FIG. 5 Amended
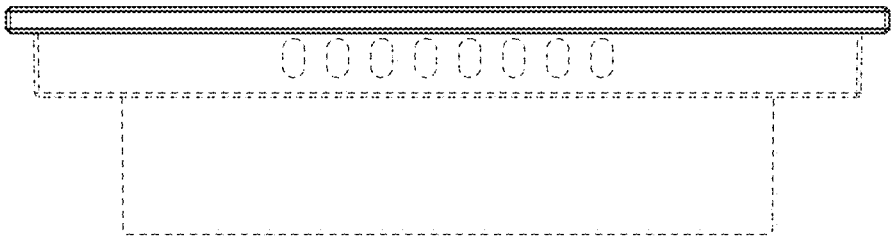
FIG. 6 Amended